United States Patent

[11] 3,626,071

[72] Inventors Takashi Kariya;
 Alfred Richardson, Jr.; Johann Martin Grisar, all of Cincinnati, Ohio
[21] Appl. No. 711,491
[22] Filed Mar. 8, 1968
[45] Patented Dec. 7, 1971
[73] Assignee Richardson-Merrell Inc.
 New York, N.Y.

[54] COMPOSITIONS AND METHODS FOR REDUCING CHOLESTEROL IN THE BLOOD
 9 Claims, No Drawings

[52] U.S. Cl. .................................................. 424/274
[51] Int. Cl. .................................................. A61k 27/00
[50] Field of Search.......................................... 424/274;
 260/999 (326.13); 167/65.5 C

[56] References Cited
UNITED STATES PATENTS
3,332,846 7/1967 Gordon .................. 424/274

OTHER REFERENCES
Chem. Abstracts— Subject Index, Vol. 67, Sec. 1804s– 05s (Dec. 1967).

Chem. Abstracts (I), Sec. 1850x, Vol. 67 (1967).
Chem. Abstracts (II), Sec. 7775(c), Vol. 50 (1956).
Chem. Abstracts (III), Sec. 9381(f), Vol. 50 (1956).

Primary Examiner—Albert T. Meyers
Assistant Examiner—Norman A. Drezin
Attorney—Harvey W. Edelblute ABSTRACT: Pharmaceutical compositions and methods for reducing the concentration of cholesterol in the blood with an indole derivative of the formula:

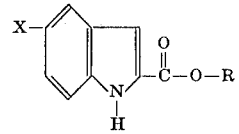

wherein X is a halogen and R is hydrogen or lower alkyl; and pharmaceutically acceptable salts of the above indole carboxylic acids with organic or inorganic bases. Illustrative of a compound of the above formula is: 5-chloroindole-2-carboxylic acid.

COMPOSITIONS AND METHODS FOR REDUCING CHOLESTEROL IN THE BLOOD

BACKGROUND AND SUMMARY OF THE INVENTION

This invention relates to compositions and methods for reducing the concentration of cholesterol in the blood by the administration to animals of indole derivatives described hereinabove. The indole derivatives employed are known compounds or can be prepared by known methods. Illustratively, 5-bromoindole-2-carboxylic acid, ethyl ester for use as a chemical intermediate is shown in G. Cavallini and V. Ravenna, *Il Farmaco, Ed. Sci.*, 13, 113–116 (1958). The synthesis of 5-chloroindole-2-carboxylic acid and its ethyl ester is described by H. Rydon and J. Tweddle, *J. Chem. Soc.* (1955). U.S. Pat. No. 3,332,846, which issued on July 25, 1967 to S. Gordon, shows compounds, some of which are isomeric to those employed in this invention, for inducing hypoglycemia.

An advantageous route for preparing compounds of this invention employs the Fischer indole synthesis starting from the appropriately substituted phenyl hydrazine and pyruvic acid followed by esterification and treatment of the resulting phenylhydrazonepyruvate with polyphosphoric acid to give the ester of the desired indole-2-carboxylic acid. Another well-known route starts from the appropriately substituted o-nitrotoluene and diethyloxalate in the presence of ethanolic potassium ethoxide to give the substituted o-nitrophenylpyruvic acid that is cyclized to the indole-2-carboxylic acid using ferrous hydroxide in dilute ammonium hydroxide solution.

DETAILED DESCRIPTION OF THE INVENTION

It has now been found that administration to warm-blooded animals of indole derivatives of the following formula and nontoxic pharmaceutically acceptable salts of the acid form (wherein R below is H) with inorganic or organic bases are effective in reducing the concentration of cholesterol in the blood serum:

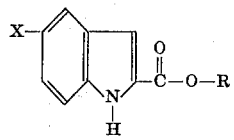

wherein X is halogen and R is hydrogen or lower alkyl. The lower alkyls as represented by R have from one to four carbon atoms, e.g., methyl, ethyl, propyl, butyl, isopropyl and iso- or tertiary-butyl. The halogen can be chlorine, bromine, iodine or fluorine. Preferably the halogen is a middle halogen, i.e., chlorine or bromine. Suitable base salts of the acid form of the above compounds are those with organic or inorganic bases such as those of alkali metals, e.g., sodium and potassium; alkaline earth metals, e.g., calcium and magnesium, light metals of group 3(a), e.g., aluminum; organic amines such as primary, secondary or tertiary amines, e.g., cyclohexylamine, ethylamine, and pyridine. The salts can be prepared by conventional means such as by contacting and neutralizing a solution of the indole derivative having a carboxylic acid group in a polar solvent with the stoichiometric quantity of a base, e.g., NaOH.

A preferred compound as the active ingredient in the methods and compositions of this invention is 5-chloroindole-2-carboxylic acid. Illustrative of the compounds which can be used in this invention, there can also be mentioned: 5-bromoindole-2-carboxylic acid; methyl 5-chloroindole-2-carboxylate; methyl 5-bromoindole-2-carboxylate; ethyl 5-chloroindole-2-carboxylate; ethyl 5-bromoindole-2-carboxylate; and the like.

Advantageously, the indole derivatives are effective in lowering cholesterol in the blood when administered orally. While the method of administering the active ingredients of the novel pharmaceutical compositions of the present invention is not limited to oral administration, a decided advantage of the present invention is that the active ingredients may be administered orally in any convenient manner. They may be taken orally, for example, with an inert diluent or pharmaceutical carrier, or with an assimilable edible carrier, or they may be incorporated by known means into such formulations as tablets, capsules, suspensions, emulsions, solutions or dispersible powders. Furthermore, the active ingredients may be administered either individually or as mixtures of a plurality of such active ingredients.

In the method of administration, daily doses of the indole derivative can be administered to animals, e.g., warm-blooded animals, for a period sufficient to lower the blood cholesterol. The daily dose necessary to induce a particular level of hypocholesterolemia will vary with the size or weight of the warm-blooded animal, e.g., rats, dogs, or other warm-blooded animals to be treated. Generally, it should be such as to give a proportionate dosage of from about 2 to 250 milligrams (mg.) per kilogram (kg.) of body weight per day for 5 or more days such as 10 or 15 days. Preferably, the indole derivative is administered to provide from about 3 mg. to about 50 mg. per kg. of body weight daily for at least 10 days. Dosing each day for at least 5 or 10 days is indicated to maintain adequate levels of concentration. In laboratory animals, this was achieved by admixture of an indole derivative to the diet. In laboratory animals (rats) it was found that a single dose of the indole derivatives at 50 mg. per kg. of body weight was ineffective in reducing plasma cholesterol. Thus as stated hereinabove, repeated dosing is indicated.

Unit dosage forms such as capsules, tablets, pills and the like can contain from about 0.1 gram to about 1 or more grams of the indole derivatives, dependent on the type of unit dosage, preferably with a significant quantity of a pharmaceutical carrier. Thus, for oral administration, capsules can contain from between about 0.1 and 1.0 gram of the indole derivative, with or without a pharmaceutical diluent. Tablets, either effervescent or noneffervescent, can contain between about 0.1 and 1.0 gram of the indole derivative together with conventional pharmaceutical carriers. Thus, tablets which may be coated and either effervescent or noneffervescent may be prepared according to the known art. Inert diluents or carriers, for example, magnesium carbonate or lactose, can be used together with conventional disintegrating agents, for example, maize starch and alginic acid and lubricating agents, for example, magnesium stearate.

Syrups or elixirs suitable for oral administration can be prepared from water-soluble salts, for example, sodium 5-chloroindole-2-carboxylic acid, and may advantageously contain glycerol and ethyl alcohol as solvents or preservatives. They may in addition contain sweetening agents and flavoring agents, for example, essential oils and coloring materials. The indole derivatives having a free carboxyl group may be administered in admixture with solid materials which have a buffering action, for example, colloidal aluminum hydroxide or calcium hydrogen phosphate.

Compositions of the invention may also be in the form of a nutritive preparation in which the active ingredient is mixed with proteins and carbohydrates, for example, casein.

The compositions described above may in addition contain dietary supplements, for example, vitamins, salts of glycerophosphoric acid, choline and inositol, and amino acids, for example, methionine.

Relatively small amounts of the indole derivatives are needed to produce the desired hypocholesterolemic effect and the compounds are effective by the oral route of administration. These indole derivatives can be used simply to lower the blood cholesterol concentration when substantially normal concentrations are present in the animal's blood serum or for lowering cholesterol concentration in animals having an excessive cholesterol level. In either case the dosages, methods and time periods for administration can be the same.

The plasma samples of animals to which indole derivatives of the invention were administered were found to be free of sterol precursors of cholesterol biosynthesis. Although it is not known by what mechanism of action these compounds lower plasma cholesterol, they do not do so by blocking one of the late steps in the biosynthesis of cholesterol.

The compounds of this invention show advantageous and unexpected properties in comparison with closely related compounds. Thus, cholesterol lowering activity was absent or insignificant in laboratory experiments similar to example 1, hereinafter, with the 3-chloro-; 7-chloro-; 1-methyl-; 5-benzyloxy-; 5-methoxy-; 4-chloro-; and 6-chloroindole-2-carboxylic acids. Furthermore, the indole derivatives of this invention show hypoglycemic activity but an absence of uterotrophic, anorexic, CNS, antifungal and antibacterial activity. Advantageously, the compounds of this invention do not cause an increase in the size and weight of the liver of experimental animals.

The following examples are illustrative of this invention.

EXAMPLE 1

HYPOCHOLESTEROLEMIC ACTIVITY OF 5-CHLOROINDOLE-2-CARBOXYLIC ACID IN IMMATURE RATS

Immature rats of the Sprague-Dawley strain weighing initially about 75 g. were given free access to a diet to which the indicated amount of 5-chloroindole-2-carboxylic acid was added. This diet was prepared by evenly spraying commercial Purina Lab Chow[1] ([1]Ralston Purina Company, St. Louis Mo.) with an ethereal or methanolic solution of a given amount of 5-chloroindole-2-carboxylic acid and allowing the solvent to evaporate. Groups of six animals were thus treated for a period of 10 days with different dose levels of 5-chloroindole-2-carboxylic acid, along with an untreated control group. The daily food consumption was measured by weighing to determine the actual dose of 5-chloroindole-2-carboxylic acid. After 10 days, the animals were sacrificed and blood samples were obtained by cardiac puncture and the plasma was analyzed for cholesterol on a Technicon AutoAnalyzer.[2] Controls, Inc., Ardsley, N.Y. The results are given in Table I.

TABLE I

Hypocholesterolemic Activity of 5-Chloroindole-2-Carboxylic Acid After 10 Days in Immature Rats[1]

| Daily Dose | | Plasma Cholesterol | |
| --- | --- | --- | --- |
| Administered % in Diet | Consumed mg./kg.[2] | mg. %[3] | % Reduction |
| 0.0625% | 75 | 61.9±4.46 | 12.3% |
| 0.125% | 150.8 | 56.8±4.35 | 19.5% |
| 0.250% | 266 | 49.5±1.61 | 29.9% |
| Control | 0 | 70.6±3.39 | 0 |

[1]Six rats per group

[2]Determined by measuring food consumption

[3]Means ± standard error of the mean

To determine whether sterol precursors of cholesterol biosynthesis were formed, plasma samples of animals treated with 5-chloroindole-2-carboxylic acid at 0.250 percent in the diet were pooled, subjected to hydrolysis to convert sterol esters to free sterols which were then extracted into petroleum ether. Aliquots were converted to trimethylsilylether derivatives and analyzed by gas-liquid chromatography using cholestane as internal standard. Only one sharp peak, corresponding to cholesterol, was observed. The hypocholesterolemic effect of 5-chloroindole-2-carboxylic acid at 0.250 and 0.125 percent in the diet as well as the absence of sterol precursors of cholesterol were confirmed in duplicate experiments. Livers from the three treated groups of rats of example 1 were excised, blotter-dried and weighed. No change in liver weight was observed as compared to the control group. The concentration of cholesterol in liver was determined and was found to be essentially unchanged as compared to control. Therefore, the reduction of plasma cholesterol cannot be attributed to redistribution of circulating cholesterol into the liver.

EXAMPLE 2

HYPOCHOLESTEROLEMIC ACTIVITY OF 5-CHLOROINDOLE-2-CARBOXYLIC ACID IN MATURE RATS

Ten mature rats of the Sprague-Dawley strain weighing about 300 g. were allowed free access to a diet containing 0.125 percent of 5-chloroindole-2-carboxylic acid for 11 days. Blood samples were obtained by cardiac puncture and the plasma was analyzed for cholesterol on a Technicon AutoAnalyzer. The results are shown in table II.

TABLE II

Hypocholesterolemic Activity of 5-Chloroindole-2-Carboxylic Acid After 11 Days in Mature Rats[1]

| Daily Dose | | Plasma Cholesterol | |
| --- | --- | --- | --- |
| Administered % in Diet | Consumed mg./kg.[2] | mg. %[3] | % Reduction |
| 0.125 | 53 | 51.6±3.1 | 28.5% |
| Control | 0 | 72.2±5.2 | 0 |

[1]Ten rats per group

[2]Determined by measuring food consumption.

[3]Means ± standard error of the mean.

EXAMPLE 3

HYPOCHOLESTEROLEMIC ACTIVITY OF OTHER INDOLE-2-CARBOXYLIC ACIDS AND ESTERS

In the manner described in example 1, a number of indole-2-carboxylic acids and esters were also found to lower serum cholesterol levels in rats. The results are given in table III.

TABLE III

Hypocholesterolemic Activity of Indole-2-Carboxylic Acids and Esters in Immature Rats[1]

| Compound | Daily Dose Administered % in Diet | Plasma Cholesterol % Reduction |
| --- | --- | --- |
| 5-bromoindole-2-carboxylic acid | 0.250% | 26% |
| Ethyl 5-bromoindole-2-carboxylate | 0.250% | 21% |

[1]Six rats per group

EXAMPLE 4

An illustrative composition for hard gelatin capsules is as follows:

Per Capsule

| | |
|---|---|
| (a) 5-Chloroindole-2-carboxylic acid | 200 mg. |
| (b) Talc | 35 mg. |

The formulation is prepared by passing the dry powders of (a) and (b) through a fine mesh screen and mixing them well. The powder is then filled into hard gelatin capsules at a net fill of 235 mg. per capsule.

EXAMPLE 5

An illustrative composition for tablets is as follows:

| | Per Tablet |
|---|---|
| (a) 5-Chloroindole-2-carboxylic acid | 100 mg. |
| (b) Wheat starch | 15 mg. |
| (c) Lactose | 33.5 mg. |
| (d) Magnesium stearate | 1.5 mg. |

Preparation: A granulation obtained upon mixing lactose with the starch and granulated starch paste is dried, screened and mixed with the active ingredient and magnesium stearate. The mixture is compressed into tablets weighing 150 mg. each.

EXAMPLE 6

An illustrative composition for pills is as follows:

| | Per Pill |
|---|---|
| (a) Ethyl 5-bromoindole-2-carboxylate | 100 mg. |
| (b) Starch, corn | 90 mg. |
| (c) Liquid glucose | 10 mg. |

The pills are prepared by blending the active ingredient and starch and then adding the liquid glucose with thorough kneading to form a plastic mass. The pills are then cut and formed from the plastic pill mass.

EXAMPLE 7

To a mixture of 40 parts of 5-bromoindole-2-carboxylic acid and 33.7 parts of liquid paraffin are added three parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. After the incorporation of a suitable flavoring agent, the mixture is homogenized by passage through a conventional homogenizer and there is thus obtained an emulsion suitable for oral administration.

EXAMPLE 8

Twenty-five parts of sodium glycerophosphate, 25 parts of calcium glycerophosphate and 50 parts of calcium 5-chloroindole-2-carboxylic acid are intimately mixed. The mixture is added gradually to 900 parts of soluble casein in a conventional mixer and mixing continued until homogeneous. There is thus obtained a dietary supplement suitable for oral administration.

What is claimed is:

1. A method for reducing the cholesterol concentration in the blood of a warm-blooded animal in need thereof which comprises repeatedly orally administering to said animal an indole derivative of the formula:

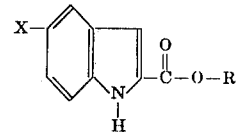

wherein X is chlorine or bromine and R is hydrogen; or a pharmaceutically acceptable salt of said indole derivative with an organic or inorganic base; in an amount and for a time sufficient to lower the cholesterol concentration.

2. The method of claim 1 which comprises administering said indole derivatives at a daily dosage of about 3 to 250 milligrams per kilogram of body weight daily for a period of at least 10 days.

3. A method of claim 2 wherein the daily dosage is from about 3 to 50 milligrams per kilogram of body weight.

4. A method of claim 2 wherein X is clorine.

5. A pharmaceutical composition having cholesterol lowering activity comprising, in unit dosage form, from about 0.1 to 1 gram of an indole derivative of the formula:

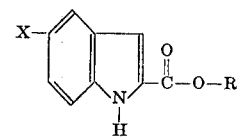

wherein X is chlorine or bromine and R is hydrogen, or a pharmaceutically acceptable salt of said indole derivative with an organic or inorganic base; and a significant quantity of a pharmaceutical carrier.

6. A composition of claim 5 wherein the indole derivative is 5-chloroindole-2-carboxylic acid.

7. A composition of claim 5 wherein the indole derivative is 5-bromoindole-2-carboxylic acid.

8. A composition of claim 5 wherein said dosage form is a capsule.

9. A composition of claim 5 wherein said dosage form is a tablet.

* * * * *